United States Patent [19]

Eder

[11] Patent Number: 4,536,040
[45] Date of Patent: Aug. 20, 1985

[54] SERVICE BRAKE ACCELERATOR FOR INDIRECT COMPRESSED-AIR BRAKES ON RAILWAY VEHICLES

[75] Inventor: Herbert Eder, Markt Schwaben, Fed. Rep. of Germany

[73] Assignee: Knorr-Bremse GmbH, Munich, Fed. Rep. of Germany

[21] Appl. No.: 285,076

[22] PCT Filed: Nov. 12, 1980

[86] PCT No.: PCT/DE 80/00170
§ 371 Date: Jul. 8, 1981
§ 102(e) Date: Jul. 8, 1981

[87] PCT Pub. No.: WO 81/01393
PCT Pub. Date: May 28, 1981

[30] Foreign Application Priority Data

Nov. 19, 1979 [DE] Fed. Rep. of Germany ....... 2946657

[51] Int. Cl.³ .............................................. B60T 15/42
[52] U.S. Cl. .......................................... 303/37; 303/82
[58] Field of Search ..................... 303/33, 37, 38, 39, 303/69, 81, 82, 83

[56] References Cited

U.S. PATENT DOCUMENTS 3,988,044 10/1976 Hill ....................................... 303/82
4,145,090 3/1979 Hart ....................................... 303/37
4,175,792 11/1979 Hart ....................................... 303/37

*Primary Examiner*—Duane A. Reger

[57] ABSTRACT

A service brake accelerator for indirect compressed-air brakes on railway vehicles includes a control piston which is loaded by the pressure in the main airpipe against the pressure in a reference pressure chamber and which controls a shutoff valve between the main airpipe and a piston chamber, a first outlet valve for the main airpipe and a second outlet valve for the piston chamber. Through appropriate dimensioning of the valve strokes (a,b), upon movement of the control piston out of its rest position the shutoff valve is closed first, and simultaneously or later the first outlet valve is opened and only subsequently the second outlet valve is opened. A valve piston arranged coaxially with the control piston is loaded by the pressure in the piston chamber and the force of a spring.

On its other side, the valve piston is acted upon by the reference pressure over a partial area, but with the air vent valve open it is acted upon by the reference pressure over its entire area. When the piston chamber is vented, and after opening of the air vent valve, the valve piston rests against a valve stem connected to the control piston, thereby equalizing changes in loading with respect to the control piston.

7 Claims, 1 Drawing Figure

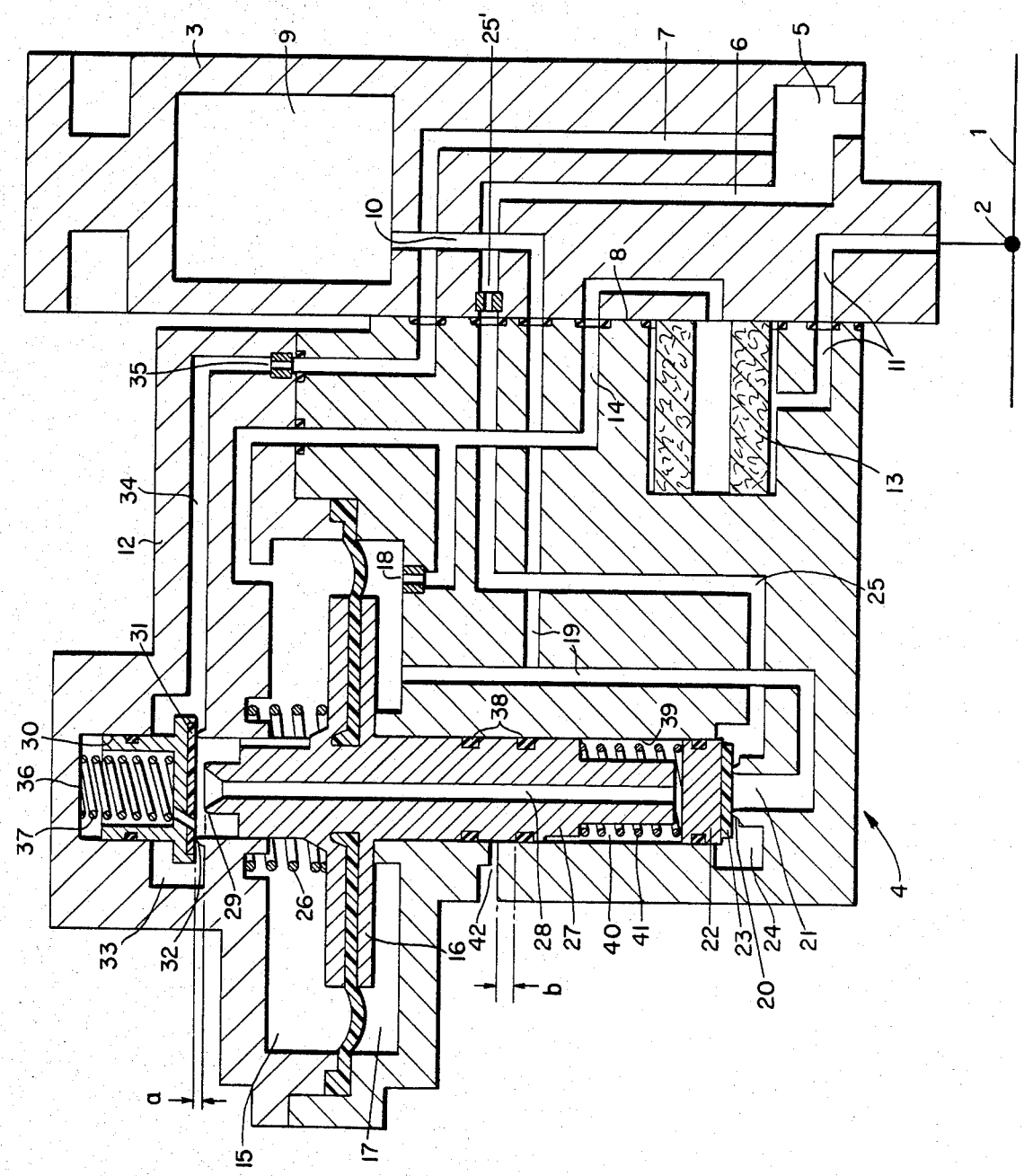

SERVICE BRAKE ACCELERATOR FOR INDIRECT COMPRESSED-AIR BRAKES ON RAILWAY VEHICLES

The invention refers to a service brake accelerator for indirect compressed-air brakes on railway vehicles, having a reference pressure chamber connected via a nozzle to the main airpipe;

a control piston loaded by the pressure in the main airpipe against the pressure in the reference pressure chamber;

a shutoff valve which can be closed by the control piston in the case of predominant action by the pressure in the reference pressure chamber, and which is in a connection from the main airpipe to a piston chamber acted upon by an auxiliary pressure;

an outlet valve system which can be opened by the control piston in the case of predominant action by the pressure in the reference pressure chamber, and is in throttled connections from the main airpipe and from the piston chamber to atmosphere; and an air vent valve controlled by a valve piston and in a connection throttled via a further nozzle, from the reference pressure chamber to the atmosphere, where:

the valve piston in the closing direction of the air vent valve is loaded by the force of a spring and the pressure in the piston chamber against the pressure in the reference pressure chamber, which with the air vent valve closed acts only upon a partial area; and where:

the control piston, the shutoff valve and the outlet valve system are arranged coaxially and the shutoff valve and the outlet valve system can be actuated by means of a valve stem connected to the control piston.

A service brake accelerator of that kind has become known from the South African Patent Application No. 77/6412. In the case of this service brake accelerator the outlet valve system from the main airpipe and from the piston chamber to atmosphere is combined into a single valve which in the case of predominant action upon the control piston by the pressure in the reference pressure chamber becomes opened in advance of the closing of the shutoff valve; hence the outlet valve system and the shutoff valve are opened simultaneously in a certain phase of operation of the known service brake accelerator. The valve piston is arranged at the side next to the control piston, whereby a structurally elaborate construction results. This known service brake accelerator is burdened with the defects that under certain conditions, for example, in the case of the pressure dropping slowly in the main airpipe as may be caused in the case of long trains and a large volume of air which has to be vented through the service brake accelerator from the main airpipe, the control piston gets stuck in its position with the outlet valve system already opened and the shutoff valve still open, and thus does not move further as far as closing of the shutoff valve. Thus it is not ensured that the service brake accelerator enters into the service function provided for it with pulsating tapping of air from the main airpipe to atmosphere, and hence there is uncertainty about the way of operation and the amount of compressed air tapped from the main airpipe in the case of the known service brake accelerator. Moreover, in the case of the known service brake accelerator it is not excluded that the further nozzle in the connection from the reference pressure chamber to atmosphere partially clogs, and thus upon opening the air vent valve a lowering of the pressure in the reference pressure chamber results which is too slow. In the known service brake accelerator, in the case of a disturbance of that kind from a trifling cause the control piston holds the shutoff valve which is inserted into the connection from the main airpipe to the outlet valve system, constantly closed so that the service brake accelerator cannot tap any air from the main airpipe and cannot exert any accelerating action to assist the drop in pressure in the main airpipe.

From the U.S. Pat. No. 3,988,044 a service brake accelerator of another construction has become known, in which by a mechanical dead stroke system between a control piston and a control rod which exhibits an auxiliary piston, a sequence of actuation of the individual valves is provided of such a kind that the defects described above cannot arise. But the dead stroke system of this service brake accelerator is costly and prone to wear and is only fully capable of operation in cooperation with certain frictions against the valve rod. But since the coefficients of friction can change in the course of service there is no guarantee of an always regular operation of this service brake accelerator.

The object of the present invention is to provide a service brake accelerator of the kind mentioned initially, which in the case of a simple cheap construction having few individual parts and low outlay on maintenance always guarantees regular operation. This object is achieved in accordance with the invention in the way that:

the outlet valve system is divided up into a first outlet valve between the main airpipe and the atmosphere, and a spatially separate second outlet valve between the piston chamber and the atmosphere; that starting from the rest position and referred to the control piston the closing stroke of the shutoff valve is at most equal to, and the opening stroke of the second outlet valve is greater than the opening stroke of the first outlet valve; and that the valve piston is arranged coaxially with the control piston and at the side where it is acted upon by pressure in the piston chamber it can rest against the end of the valve stem.

The dividing up of the outlet valve system into the two outlet valves and the different opening strokes for these outlet valves guarantees a sequence of control procedures which excludes undesirable sticking of the control piston in an intermediate position, and the arrangement of the valve piston with its possibility of resting against the valve stem assists the movements of the control piston in such a way that adequate accelerating action is achieved by tapping sufficient amounts of compressed air from the main airpipe.

The advantageous refinement of the service brake accelerator according to the further invention can be derived from the claims.

The drawing shows as an embodiment of the invention a diagrammatic sectional view through a service brake accelerator designed in accordance with the invention.

From a main airpipe 1 a branch pipe 2 leads to a valve carrier 3 onto which the service brake accelerator 4 is flanged in a manner favourable to maintenance. In the valve carrier 3 there is an outlet chamber 5 which is permanently connected to the atmosphere and protected against fouling and from which two channel connections 6 and 7 lead to the flange connection 8 to the service brake accelerator 4. Moreover in the valve carrier 3 there is a reference pressure chamber 9 having a further channel connection 10 to the flange connection 8.

From the branch pipe 2 a channel 11 leads to an ordinary air filter 13 arranged in the casing 12 of the service brake accelerator 4 and upon loosening the flange connection 8, accessible from the latter. From the air filter 13 a channel connection 14 running partly in the valve carrier 3 and passing through the flange connection 8, leads to a main airpipe chamber 15 which by means of a control piston 16 made as a diaphragm piston is separated from a chamber 17. The chamber 17 which is connected via a nozzle 18 to the channel connection 14 is connected via a channel 19 to a space 21 surrounded by a valve seat 20, and to the channel connection 10 and thereby the reference pressure chamber 9. The valve seat 20 forms together with a valve seal 23 resting against it and held against a valve piston 22, an air vent valve 20,23, which is inserted between the space 21 and an annular space 24 surrounding the valve seat 22. From the annular space 24 a channel 25 leads through a nozzle 25' and the channel connection 6 to the outlet chamber 5.

The control piston 16 is loaded by a spring 26 arranged in the main airpipe chamber 15 and through it passes a valve stem 27 which exhibits an axial bore 28 extending through the whole length of it. At the side next the main airpipe chamber 15 the valve stem 27 ends in a valve seat 29 which surrounds the mouth of the axial bore 28 and opposite to which lies a double valve sealing plate 31 which exhibits on the other side a tubular extension 30 which is guided to be able to slide in a sealed manner in the casing 12. The valve seat 29 forms together with the double valve sealing plate 31 a shutoff valve 29,31, between the main airpipe chamber 15 and the axial bore 28. The second sealing area of the double valve sealing plate 31 forms together with a further valve seat 32 fixed in the casing a first outlet valve 31,32, between the main airpipe chamber 15 and a space 33 which contains the double valve sealing plate 31 and which is connected via a channel 34, a nozzle 35 and the channel connection 7 permanently to the outlet chamber 5. In the space 36 which is enclosed by the tubular extension 30 and is connected via an aperture in the double valve sealing plate 31 to the space between the two valve seats 29 and 32, there is a spring 37 which loads the double valve sealing plate 31. The part of the valve stem 27 which projects from the control piston 16 next the chamber 17 is supported in its central section by means of two sealing rings 38 to be able to slide in a sealed manner in the casing 12 after the style of a valve slide. The end section of the valve stem 27 exhibits a reduced diameter so that between it and the wall 39 of the casing 12 an annular piston chamber 40 is formed, which is connected permanently to the axial bore 28 and in which there is a spring 41 which rests at one end against the valve stem 27 and at the other end against the valve piston 22. The valve piston 22 guided against the wall 39 of the piston chamber 40 exhibits the same diameter as the valve stem 27 and this diameter is many times smaller than the diameter of the operating piston 16. The diameter of the valve seat 20 is less than the diameter of the valve piston 22 so that the pressure occurring in the space 21 acts upon only part of the area of the valve piston 22. The casing 12 exhibits a constricted air vent bore 42 which opens into the guide bore for the valve-slide-like section of the valve stem 27, and over which the sealing ring 38 which is the lower one in the drawing can slide.

In the state of rest of the service brake accelerator it adopts the position shown, in which the control piston 16 is lying in its bottom end position in accordance with the drawing. The shutoff valve 29,31, and the first outlet valve 31,32, combined structurally into a double valve 29,31,32, adopts the operating position shown, in which the first outlet valve 31,32, is closed by contact of the double valve sealing plate 31 against the valve seat 32 and the shutoff valve 29,31 is opened by a closing stroke a which has to be overcome for closing it. The lower of the two sealing rings 38 is lying at a distance below the air vent bore 42, which forms an opening stroke b, in such a way that the slide valve 38,42 formed from the sealing ring 38 and the air vent bore 42 to represent the second outlet valve, opens only after the raising of the valve stem 27 by the opening stroke b. The air vent valve 20,23, is closed. With the compressed air brake released there prevails in the main air pipe 1 and thereby also in the main airpipe chamber 15 as well as in the chamber 17 filled via the nozzle 18, the reference pressure chamber 9, the space 21 and the piston chamber 40, the normal pressure level.

If for the initiation of a service braking the pressure in the main airpipe 1 drops at a certain pressure gradient corresponding with service brakings, the pressure in the main airpipe chamber 15 also drops to correspond. The pressure is held back in the chamber 17 by the nozzle 18, and the control piston 16 therefore rises against the force of the spring 26. In doing so the valve seat 29 after overcoming the closing stroke a comes into contact with the double valve sealing plate 31, so that the shutoff valve 29, 31 is closed and the pressure from the main airpipe 1 prevailing in the piston chamber 40 gets shutoff and cannot drop with the main airpipe pressure. In the case of a slight further drop in pressure in the main airpipe the control piston 16 continues its lifting movement, taking along with it the double valve sealing plate 31 against the force of the spring 37, whereupon the first outlet valve 31,32 gets opened and compressed air flows away out of the main airpipe 1 through the main airpipe chamber 15 and the open outlet valve 31,32 as well as the nozzle 35 and the outlet chamber 5 to atmosphere; through this flowing away of compressed air out of the main airpipe 1 the dropping of the pressure in the main airpipe 1 gets reinforced and restored in such a way that the braking installations of vehicles which in the formation of the train follow the vehicle which exhibits the service brake accelerator 4, also respond reliably. Through the flowing away of compressed air out of the main airpipe chamber 15 the lifting movement of the control piston 16 gets reinforced, so that after covering the opening stroke b the lower sealing ring 38 slides over the air vent bore 42 which hitherto has been lying between the two sealing rings 38 and has thereby been shut off. The compressed air stored in the piston chamber 40 and loading the valve piston 22 now flows away via the air vent bore 42 to atmosphere and the pressure from the chamber 17 occurring in the space 21 to load part of the area of the valve piston 22 is therefore capable of raising the valve piston 22 against the force of the spring 41.

From the chamber 17 out of which hitherto only a small amount of air was able to flow away through the nozzle 18 to the main airpipe 1, compressed air now flows away to the atmosphere in addition through the channel 19, the space 21, the open air vent valve 20,23, the channel 25 with the nozzle 25' and the outlet chamber 5, in such a way that the pressure in the chamber 17 drops more rapidly than in the main airpipe chamber 15. It is essential that upon opening the air vent valve 20,23 the pressure previously existing only in the space 21 also acts upon the annular space 24 and thereby the whole bottom face of the valve piston 22 so that the latter now gets raised with considerable excess force, rests against the bottom end of the valve stem 27 and exerts upon the valve stem 27 a force directed upwards; hence the pneumatic loading of the valve stem 27 which disappears through the venting of the piston chamber 40, gets replaced by the force exerted by the valve piston 22, and the first outlet valve 31,32 therefore continues to remain open for the time being. After an adequate drop in pressure in the chamber 17 down to a pressure which prevails briefly in the main airpipe chamber 15 too, the control piston 16 with the valve stem 17 drops again, whereupon first of all the lower sealing ring 38 slides over the air vent bore 42 and thereby closes the slide valve 38,42, that is, it shuts off the piston chamber 40 from the atmosphere, and then the double valve sealing plate 31 rests against the valve seat 32 and hence through the closing of the first outlet valve 31,32, interrupts the venting of the main airpipe 1 as well as the main airpipe chamber 5 through the first outlet valve 31,32, and finally the valve seat 29 drops down away from the double valve sealing plate 31, whereby through the shut off valve 29,31 which has now been opened again, pressure from the main airpipe flows in through the axial bore 28 into the piston chamber 40. The pressure building up in the piston chamber 40 through the assistance from the spring 41 is capable of sliding the valve piston 22 downwards against the action upon it by the pressure existing in the spaces 21 and 24, so that the air vent valve 20,23 gets closed and thereby the additional venting of the chamber 17 gets interrupted. An operational cycle of the service brake accelerator is thereby completed.

In the event of the pressure in the main airpipe 1 dropping in the future, the processes described above are repeated, so that via the service brake accelerator compressed air is again tapped from the main airpipe 1 to atmosphere, as long as the first outlet valve 31,32 is open. The operational cycles of the service brake accelerator 4 are repeated as long as the pressure in the main airpipe 1 is lowered. If the pressure in the main airpipe 1 is kept constant at a reduced pressure level corresponding with a certain stage of braking, the service brake accelerator 4 upon reaching the operational position shown completes its operational cycles, remains at rest and taps no more air from the main airpipe 1 to atmosphere. But in the case of a later further drop in pressure in the main airpipe 1 the service brake accelerator 4 resumes its previously described activity with cyclical tapping of air from the main airpipe 1, and all of the processes described are correspondingly repeated.

If the main airpipe 1 gets charged up again to normal pressure level for subsequent releasing of the brakes, the service brake accelerator 4 preserves its operational position as shown, whilst its spaces and chambers connected to the main airpipe 1 likewise get charged up to normal pressure level. The original state is thereby reached again.

Through the construction and arrangement of the valves in combination with the different closing and opening strokes a and b there is enforced in the service brake accelerator 4 a reliable operational sequence which ensures that the air vent valve 20,23 upon the raising of the control piston 16, that is, in the first half of an operational cycle, operates as the last valve, i.e., it opens, but in the second half of the operational cycle at the lowering of the control piston 16 it likewise operates as the last valve, i.e., it closes again, so that sticking of the control piston 16 in any intermediate positions whatsoever is excluded through the progress of the operational sequence.

Also partial or total clogging of the small nozzle 25' or air vent bore 42 which supervise the air venting processes for the chamber 17 and the piston chamber 40 respectively cannot bring about any failure of the service brake accelerator 4, since upon the pressure dropping in the main airpipe 1 and the main airpipe chamber 15 the control piston 16 gets raised in any case as far as the opening of the first outlet valve 31,32 and hence additional compressed air gets tapped from the main airpipe 1 via the service brake accelerator 4. Rapid braking of the vehicle or respectively of the train is thus guaranteed even in this case.

The equal diameters of the valve stem 27 and the valve piston 22 guarantee after venting of the piston chamber 40 and the resting of the valve piston 22 against the bottom end of the valve stem 27, that through these processes no change in force occurs, referred to the system consisting of the valve stem 27 and control piston 16, and thus the first outlet valve 31,32 which in doing so is opened, remains sucurely held open still. The bearing of the top end of the spring 41 against the valve stem 27 assists this method of operation, but in principle it is also possible to support the top end of the spring 41 against a stop on the casing.

The relieving of load on the double valve sealing plate 31 through acting upon the space 36 with the pressure prevailing between the valve seats 29 and 32 yields a low threshold of response of the service brake accelerator, determined essentially by the spring 26.

I claim:

1. A service brake accelerator for indirect brakes on railway vehicles, having
    a reference pressure chamber connected via a nozzle to the main airpipe;
    a control piston loaded by the pressure in the main airpipe against the pressure in the reference pressure chamber;
    a shutoff valve which can be closed by the control piston in the case of predominant action by the pressure in the reference pressure chamber, and which is in a connection from the main airpipe to a piston chamber acted upon by an auxiliary pressure;
    an outlet valve system which can be opened by the control piston in the case of predominant action by the pressure in the reference pressure chamber, and is in throttled connections from the main airpipe and from the piston chamber to atmosphere; and
    an air vent valve controlled by a valve piston and in a connection throttled via a further nozzle, from the reference pressure chamber to the atmosphere, where:
    the valve piston in the closing direction of the air vent valve is loaded by the force of a spring and the pressure in the piston chamber against the pressure in the reference pressure chamber, which with the air vent valve closed acts only upon a partial area; and where:

the control piston, the shutoff valve and the outlet valve system are arranged coaxially and the shutoff valve and the outlet valve system can be actuated by means of a valve stem connected to the control piston, characterized in that:

the outlet valve system comprises a first outlet valve (31, 32) between the main airpipe (1) and the atmosphere, and a spatially separate second outlet valve (38, 42) between the piston chamber (40) and the atmosphere; that the shutoff valve (29,31) having a closing stroke (a) which is at most equal to an opening stroke of the first outlet valve (31, 32) beginning from a rest position and with reference to the control piston (16), the second outlet valve (38,42) having an opening stroke (b) which is greater than the opening stroke of the first outlet valve (31,32);

the valve piston (22) is disposed coaxially with the control piston (16) and at the side thereof where said valve piston is acted upon by pressure in the piston chamber (40) and is engageable against an end of the valve stem (27).

2. A service brake accelerator as in claim 1, characterized in that the shutoff valve (29,31) and the first outlet valve (31,32) are combined into a double valve (29,31,32) and that the second outlet valve is made as a slidevalve (38, 42) with the valve stem (27) as the valve slide.

3. A service brake accelerator as in claim 2, characterized in that the valve stem (27) passes through the control piston (16) and exhibits a continuous axial bore (28), that the end of the valve stem (27) lying at the side where it is acted upon by the pressure in the main airpipe, is made as the valve seat (29) belonging to the shutoff valve (29,31) and surrounding the mouth of the axial bore (28) and opposite to which lies a double sealing plate (31) which is loaded by the spring (37) and which with a further valve seat (32) fixed to the casing forms the first outlet valve (31,32), and that the valve stem (27) on the other side of the control piston (16) forms the valve slide guided to be able to slide in a sealed manner in the casing, projects into the piston chamber (40) and ends in the latter in front of the valve piston (22) which is guided against the wall (39) of the piston chamber (40).

4. A service brake accelerator as in claim 3, characterized in that the diameter of the control piston (16) is many times greater than the diameter of the valve piston (22).

5. A service brake accelerator as in claim 4, characterized in that the valve stem (27) and the valve piston (22) exhibit at least approximately equal diameters.

6. A service brake accelerator as in claim 5, characterized in that the spring (41) loading the valve piston (22) bears at the other end against the valve stem (27).

7. A service brake accelerator as in claim 3, characterized in that the double sealing plate (31) is arranged in the casing (12) to be pneumatically relieved of load.

* * * * *